(12) United States Patent
Lautenschlager et al.

(10) Patent No.: US 6,824,881 B2
(45) Date of Patent: Nov. 30, 2004

(54) THERMOPLASTIC SILICONE BLOCK COPOLYMERS, THE PRODUCTION THEREOF AND THE USE OF THE SAME

(75) Inventors: Hans Lautenschlager, Haiming (DE); Jochen Dauth, Burghausen (DE); Wolfgang Keller, Mehring (DE); Theo Mayer, Julbach (DE); Kurt Stark, Burgkirchen (DE)

(73) Assignee: Wacker-Chemie GmbH, Munich (DE)

( * ) Notice: Subject to any disclaimer, the term of this patent is extended or adjusted under 35 U.S.C. 154(b) by 7 days.

(21) Appl. No.: 10/451,594

(22) PCT Filed: Dec. 13, 2001

(86) PCT No.: PCT/EP01/14708

§ 371 (c)(1),
(2), (4) Date: Jun. 23, 2003

(87) PCT Pub. No.: WO02/050167

PCT Pub. Date: Jun. 27, 2002

(65) Prior Publication Data

US 2004/0054115 A1 Mar. 18, 2004

(30) Foreign Application Priority Data

Dec. 21, 2000 (DE) .......................... 100 64 074
Dec. 21, 2000 (DE) .......................... 100 64 092

(51) Int. Cl.[7] .......................... B32B 27/32; B32B 9/04
(52) U.S. Cl. .......................... 428/447; 428/500; 528/24; 528/25; 528/31; 525/100; 525/106
(58) Field of Search .......................... 428/447, 500; 525/100, 106; 528/24, 25, 31

(56) References Cited

U.S. PATENT DOCUMENTS

| | | |
|---|---|---|
| 4,584,356 A | 4/1986 | Crivello |
| 4,673,611 A | 6/1987 | Crass et al. |
| 4,675,361 A | 6/1987 | Ward, Jr. |
| 4,677,169 A | 6/1987 | Crivello |
| 4,954,408 A | 9/1990 | Georges |
| 5,068,303 A | 11/1991 | Bard et al. |
| 5,086,141 A | 2/1992 | Georges |
| 5,229,179 A | 7/1993 | Kumar et al. |
| 5,700,571 A | 12/1997 | Logue et al. |
| 6,469,115 B1 * | 10/2002 | Faust et al. .......... 526/194 |

FOREIGN PATENT DOCUMENTS

| | | |
|---|---|---|
| EP | 0 168 624 | 1/1986 |
| EP | 0 254 050 | 1/1988 |
| EP | 0 541 103 A1 | 5/1993 |
| EP | 1 024 153 | 8/2000 |
| EP | 0 653 447 | 6/2001 |
| FR | 2 466 481 | 10/1979 |
| WO | WO 91/15538 | 10/1991 |
| WO | WO 95 00577 | 1/1995 |
| WO | WO 95 00578 | 1/1995 |
| WO | WO 96 39459 | 12/1996 |
| WO | WO 98 38240 | 9/1998 |

OTHER PUBLICATIONS

"Development of Functionalized Organomodified Polysiloxanes and their use as Novel Macroinitiators in Atom Transfer Radica Polymerizations", Matyjaszewski et al., Polymer Preprints (2002) 43(2), pp. 233–234.*
English Abstract corresponding to EP 0168 624 B1.
English Abstract corresponding to JP 01–121373 A Ref. No. 89–182865125.
English Abstract corresponding to JP 63–258909 A, Derwent Abstract Ref. No. 88–348806/49.
English Abstract corresponding to FR 2 466 481.

* cited by examiner

Primary Examiner—Margaret G. Moore
Assistant Examiner—Marc S. Zimmer
(74) Attorney, Agent, or Firm—Brooks Kushman P.C.

(57) ABSTRACT

Thermoplastic silicon block copolymers containing (A) a hard segment polymer constituent prepared from styrene, methylmethacrylate, butylacrylate, acrylonitrile, vinyl monomers, or mixtures therefore, and (B) a soft segment polymer constituent of general formula (I) G-[(SiR$_2$O)$_m$SiR$_2$—X—]$_n$(SiR$_2$O)$_m$SiR$_2$-G wherein R is an optionally halogenated monovalent C$_{1-18}$ hydrocarbon radical and X is a specific aryl group-containing, silicon bonded radical, and each G may be a radical (A)-Z-(Si) or Z'-(Si) wherein -Z- represents an aryl group-containing bivalent radical and Z'- represents a monovalent aryl group-containing radical, provided that there is, at most, one radical G and one radical Z'- in formula (I). In formula (I), m represents a whole number between 1 and 1000 and n represents 0 or a whole number between 1 and 20, provided that when n does not equal 0, $4 \leq n \cdot m \leq 1000$.

15 Claims, No Drawings

THERMOPLASTIC SILICONE BLOCK COPOLYMERS, THE PRODUCTION THEREOF AND THE USE OF THE SAME

BACKGROUND OF THE INVENTION

1. Field of the Invention

The invention relates to thermoplastic silicone block copolymers, their preparation and use.

2. Description of the Related Art

To produce abhesive coatings curable polyorganosiloxanes are applied to substrate materials and then cured with supply of thermal energy or by radiation. Curing of the coating material is frequently the rate-determining step in the production of abhesive substrate materials. An additional necessity is that of installing drying ovens or UV or IR lamps. Their operation, moreover, is energy-intensive. Accordingly, more recent developments have been aimed at providing coating materials which allow this curing step to be omitted.

EP-A 168 624 and the corresponding U.S. Pat. No. 4,673,611 describe the coextrusion of PP backing films with an antiadhesive layer comprising polydimethylsiloxane.

EP-A 541 103 describes laminated PET films by application of emulsions of polysiloxane-polyvinyl graft polymers.

EP-A 254 050 describes the production of a release liner by extruded application of a mixture of polymer and silicone resin.

U.S. Pat. No. 5,700,571 describes release films produced by coextrusion with organic release materials.

U.S. Pat. No. 5,086,141 describes a crosslinked polysiloxanestyrene/butadiene copolymer.

WO 96/39459 describes-block copolymers of ethylene and cyclic siloxane monomers which can be used in coextrusion for release liners. In a blend with HDPE, release liners having good abhesive properties are obtainable.

WO 95/00578 describes coextrusion-prepared copolymers of monofunctional silicones and polyolefins, which can be used as release material.

WO 91/15538 describes release films comprising a base polymer and a silicone copolymer. This copolymer is added to the base polymer as an additive.

The products employed to date, however, frequently exhibit unsatisfactory abhesive properties, migration from the release layer or low substrate adhesion, or are difficult to obtain by synthesis.

An object was therefore to provide thermoplastic silicone block copolymers which are suitable for producing abhesive coatings and with which the abovementioned drawbacks are avoided.

The invention provides thermoplastic silicone block copolymers comprising:

(A) a hard segment polymer component comprising a polymer prepared from monomers selected from the group consisting of styrene, methyl methacrylate, butyl acrylate, acrylonitrile, vinyl monomers, and mixtures thereof, and (B) a soft segment polymer component of the general formula

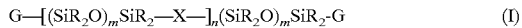

G—[(SiR$_2$O)$_m$SiR$_2$—X—]$_n$(SiR$_2$O)$_m$SiR$_2$-G     (I)

where each R can be identical or different and is a monovalent, optionally halogenated hydrocarbon radical having 1 to 18 carbon atoms per radical, X is a divalent radical selected from the group consisting of the radicals of the formula

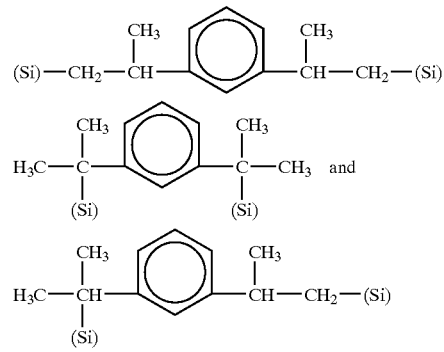

each G can be identical or different and is a radical (A)-Z-(Si) or Z'-(Si), where Z is a divalent radical selected from the group consisting of radicals of the formula

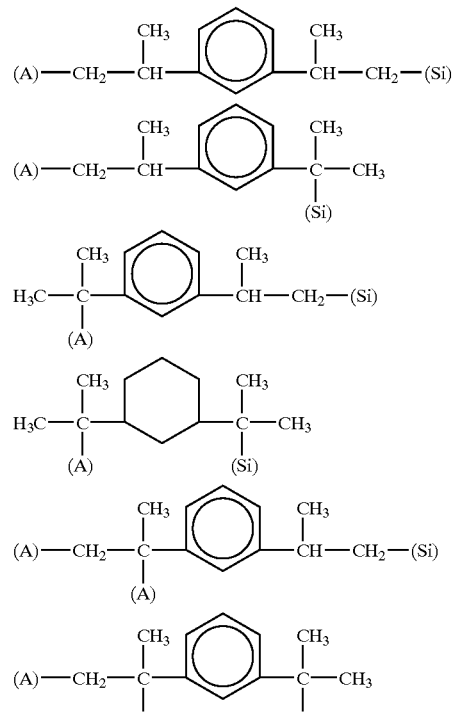

and Z' is a monovalent radical of the formula

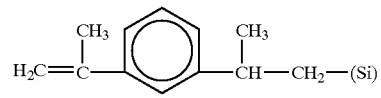

-continued

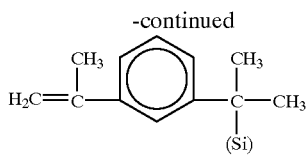

where (A)- is a bond to the hard segment polymer component (A) and (Si)— is a bond to the silicon atom in (B), with the proviso that in the formula (I) not more than one radical G can be a radical Z'-, m is an integer from 1 to 1000, preferably from 1 to 500, and n is 0 or an integer from 1 to 20, with the proviso that if n is not 0 then for the product of n and m it is the case that $4 \leq n \cdot m \leq 1000$.

The two components of the silicone block copolymer of the invention are a nonpolar soft segment (B) and a polar hard segment (A). The nonpolar soft block is a silicone segmented by organic groups which has a low free surface energy, while the hard segment is characterized by the ability to adhere to the surface of the substrate. In addition the hard segment gives the silicone block copolymer physical properties such that the silicone block copolymer is not liquid at 25° C. and can be extruded.

The expression "segmented" refers to a relatively short length of a repeating unit.

The silicone block copolymers of the invention are preferably of the formula A-B-A. The silicone block copolymers may have a number of different configurations depending on the number of polymer blocks suspended from the soft segment, a silicone segmented by organic groups. In their simplest form the copolymers can have the configuration A-B. The silicone block copolymers may also be of the type B-A-B or A-B-A-B, etc., depending on the coupling methods or formation methods for the blocks. The silicone block copolymers of the invention may vary in their composition and structure. They can be grafted, branched or linear block copolymers; as block copolymers they contain repeating segments or blocks of the same monomeric unit. The average block length of one polymerized comonomer component may differ, however, from the average block length of a second polymerized comonomer component, and it is the relative average block lengths which largely determine the properties of the silicone block copolymers.

The silicone block copolymers of the invention possess a molecular weight ($M_w$) of preferably from 3,000 to 2,000,000 g/mol, more preferably from 5,000 to 1,000,000 g/mol, very preferably from 10,000 to 500,000 g/mol.

The silicone block copolymers of the invention contain the soft segment polymer component (B) in amounts of preferably from 1 to 75% by weight, more preferably from 1 to 50% by weight, most preferably from 5 to 40% by weight, based in each case on the overall weight of the silicone block copolymer.

A preferred hard segment polymer component (A) is polystyrene.

Examples of radicals R are alkyl radicals, such as the methyl, ethyl, n-propyl, iso-propyl, 1-n-butyl, 2-n-butyl, iso-butyl, tert-butyl, n-pentyl, iso-pentyl, neo-pentyl, tert-pentyl radical, hexyl radicals, such as the n-hexyl radical, heptyl radicals, such as the n-heptyl radical, octyl radicals, such as the n-octyl radical and iso-octyl radicals, such as the 2,2,4-trimethylpentyl radical, nonyl radicals, such as the n-nonyl radical, decyl radicals, such as the n-decyl radical, dodecyl radicals, such as the n-dodecyl radical, and octadecyl radicals, such as the n-octadecyl radical; cycloalkyl radicals, such as cyclopentyl, cyclohexyl, cycloheptyl, and methylcyclohexyl radicals; aryl radicals, such as the phenyl, naphthyl, anthryl, and phenanthryl radical; alkaryl radicals, such as o-, m-, p-tolyl radicals, xylyl radicals, and ethylphenyl radicals; and aralkyl radicals, such as the benzyl radical, the α- and the β-phenylethyl radical.

Examples of halogenated radicals R are haloalkyl radicals, such as the 3,3,3-trifluoro-n-propyl radical, the 2,2,2,2',2',2'-hexafluoroisopropyl radical, the heptafluoroisopropyl radical, and haloaryl radicals, such as the o-, m-, and p-chlorophenyl radical.

One example of a silicone block copolymer of the invention with n=0 is one of the following formula: (PS= polystyrene, R=methyl radical, m=1-1000)

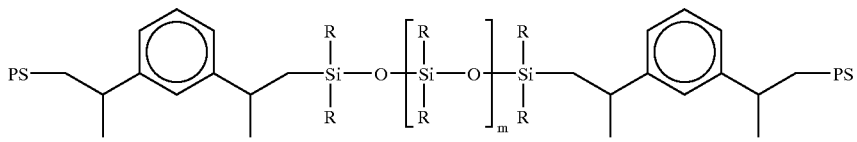

One example of a silicone block copolymer of the invention with n=1 is one of the following formula: (PS= polystyrene, Me=methyl radical)

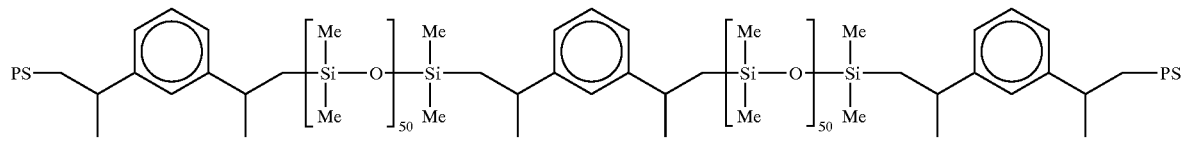

Segmented block copolymers can be prepared by a number of procedures, which differ in the extent to which the structure of the resulting product can be defined, as is described in U.S. Pat. No. 4,675,361.

One procedure includes the coupling of at least two preformed blocks or segments prepared prior to the coupling reaction in separate reactions. This approach produces a well-defined structure if the coupling reaction prevents identical blocks or segments from reacting with themselves and allows only unlike blocks or segments to couple to one another.

Other coupling reactions may occur, resulting in a less defined structure, if the two preformed blocks or segments possess the ability (by way of the coupling reaction) as well to react with themselves, in the same way as the unlike blocks or segments.

In one preferred coupling reaction at least one preformed block or preformed, segment is coupled during a coupling reaction with a second block or segment which is produced during the coupling reaction. In this case the original length (molecular weight) of the preformed block or segment is known (owing to a separate reaction which is used for its preparation) but the sequence distribution of the copolymer is not known exactly, since both coupling growth and chain growth are possible in the reaction which produces the second block or second segment.

The invention therefore further provides a process for preparing the thermoplastic silicone block copolymers of the invention, characterized in that the soft segment polymer (B') of the general formula

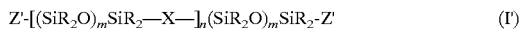

where R, X, Z', n, and m are as defined above, is reacted with monomers of the hard segment polymer component (A) in the presence of free-radical initiators in a free radical addition polymerization.

One kind of monomer or mixtures of different monomers of the hard segment polymer component (A) can be used. A preferred monomer of the hard segment polymer component (A) is styrene.

The soft segment polymer (B') used in the process of the invention has a viscosity of preferably from 20 to 100,000 mPa.s at 25° C., preferably from 500 to 10,000 mPa.s at 25° C.

In the case of the process of the invention the amount of monomer of (A) and soft segment polymer (B') employed is chosen such that the resulting silicone block copolymers contain the soft segment polymer component (B) in amounts of preferably from 1 to 75% by weight, more preferably from 1 to 50% by weight, very preferably from 5 to 40% by weight, based in each case on the overall weight of the silicone block copolymer.

The process of the invention is carried out at a temperature of preferably from 40 to 100° C., more preferably from 60 to 90° C., and preferably at the pressure of the surrounding atmosphere, i.e., approximately at 1020 hPa (abs.). Alternatively, it can be carried out at higher or lower pressures.

Prior to the coupling reaction the silicone segmented by organic groups, the soft segment polymer (B'), is prepared in a hydrosilylation reaction, by reacting an α,ω-dihydropolydiorganosiloxane (1) of the formula

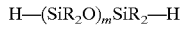

where R and m are as defined above with 1,3-diisopropenylbenzene (2) in the presence of a catalyst (3) which promotes the addition of Si-bonded hydrogen onto aliphatic double bond.

If n in the formula (I) is 0 the 1,3-diisopropenylbenzene (2) is used in the hydrosilylation reaction in amounts such that the ratio of C=C double bond in 1,3-diisopropenylbenzene (2) to Si-bonded hydrogen in α,ω-dihydropolydiorganosiloxane (1), i.e., the C=C/SiH ratio, is preferably from 5.0 to 2.0.

If n in the formula (I) is an integer from 1 to 20, the 1,3-diisopropenylbenzene (2) is used in the hydrosilylation reaction in amounts such that the ratio of C=C double bond in 1,3-diisopropenylbenzene (2) to Si-bonded hydrogen in α,ω-dihydropolydiorganosiloxane (1), i.e., the C=C/SiH ratio, is preferably from 1.5 to 1.0.

The catalyst (3) preferably comprises a metal from the group of the platinum metals or a compound or a complex from the group of the platinum metals. Examples of such catalysts are metallic and finely divided platinums, which may be present on supports, such as silica, alumina or activated carbon, compounds or complexes of platinum, such as platinum halides, e.g., $PtCl_4$, $H_2PtCl_6 \cdot 6H_2O$, $Na_2PtCl_4 \cdot 4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without detectable inorganic halogen, bis(gamma-picoline)platinum dichloride, trimethylenedipyridineplatinum dichloride, dicyclopentadieneplatinum dichloride, dimethyl sulfoxide-ethyleneplatinum(II) dichloride, cyclooctadieneplatinum dichloride, norbornadieneplatinum dichloride, gamma-picolineplatinum dichloride, cyclopentadieneplatinum dichloride, and reaction products of platinum tetrachloride with olefin and primary amine or secondary amine or primary and secondary amine, such as the reaction product of platinum tetrachloride in solution in 1-octene with sec-butylamine, or ammoniumplatinum complexes.

In the hydrosilylation reaction the catalyst (3) is used preferably in amounts of from 0.01 to 10 ppm by weight (parts by weight per million parts by weight), preferably in amounts of from 0.5 to 5 ppm by weight, calculated in each case as elemental platinum and based on the overall weight of the α,ω-dihydropolydiorganosiloxane (1) and the 1,3-diisopropenylbenzene (2).

The free-radical addition polymerization can be an emulsion polymerization, a suspension polymerization, polymerization in solution or precipitation polymerization in a solvent which dissolves the monomers but precipitates the resultant silicone block copolymer.

Examples of free-radical initiators are oil-soluble initiators, such as tert-butyl peroxy-2-ethylhexanoate, tert-butyl peroxypivalate, tert-butyl peroxyneodecanoate, dibenzoyl peroxide, tert-amyl peroxypivalate, di(2-ethylhexyl) peroxydicarbonate, 1,1-bis(t-butylperoxy)-3,3,5-trimethylcyclohexane, and di(4-tert-butylcyclohexyl) peroxydicarbonate.

In the process of the invention it is possible to use reducing agents, such as sodium sulfite, sodium hydrogencarbonate or ascorbic acid.

For the emulsion polymerization it is possible to use water-soluble initiators, such as ammonium peroxodisulfate, potassium peroxodisulfate, and sodium peroxodisulfate, alone or together with a reducing agent.

The molecular weight $M_w$ of the silicone block copolymer can also be controlled by adding chain transfer agents or chain regulators, such as isopropanol, ethylbenzene (preferably in the case of suspension polymerization) or dodecyl mercaptan.

In the case of polymerization in solution it is possible to use organic solvents, such as tetrahydrofuran (THF), petroleum ether, ethyl acetate, isopropanol, ethanol, methanol, toluene or benzene, toluene being preferred. A mixture of these organic solvents can be used in order to precipitate the silicone block copolymer during the polymerization, and the amount of the organic solvent or mixtures thereof allows the molecular weight to be regulated. The silicone block copolymers obtained in the suspension polymerization can be distilled, preferably under reduced pressure, or treated with steam (steam stripping) in order to remove the volatile organic compounds.

The silicone block copolymers of the invention are used preferably for producing abhesive coatings, i.e., coatings which repel tacky substances, e.g., release paper, polymeric release sheets or release films.

The target release properties of the abhesive coatings or films can be achieved through any one of the following methods or through a combination thereof:

(a) Varying the chain length of the soft segment.
(b) Varying the weight percentages of the soft segment in the silicone block copolymer.
(c) Varying the degree of segmentation in the silicone segmented by organic groups, the soft segment.
(d) Varying the degree of crosslinking between the copolymer chains.

The abhesive coatings obtained with the silicone block copolymers of the invention have very good release properties, which can be tailored to many different specific applications. The abhesive coatings of the invention exhibit good adhesion to the substrate. Through selection of the soft segment polymer component and its amount in the silicone block copolymer of the invention it is possible to obtain a wide range of desired release properties. The silicone block copolymers of the invention can be applied preferably by extrusion to substrates or are applied during the production of the films in a coextrusion operation.

The silicone block copolymers of the invention, preferably in the form of solutions in organic solvents, such as toluene, petroleum spirit, ethyl acetate or xylene, can be applied to surfaces which are to be made repellant to tacky substances. Application may take place in any desired way which is widely known and suitable for the production of coatings from liquid substances: for example, by dipping, brushing, pouring, spraying, rolling on, printing, using an offset gravure coating apparatus, for example, blade coating or knife coating, or by means of an airbrush.

Examples of surfaces to be made repellant to tacky substances are those of paper, wood, cork, and polymer films, e.g., polyethylene films or polypropylene films, woven and nonwoven fabric of natural and synthetic fibers, ceramic articles, glass, including glass fibers, metals, polyethylene-coated paper, and boards, including those of asbestos. The abovementioned polyethylene may in each case be high-pressure, medium-pressure or low-pressure polyethylene. In the case of paper the paper in question may be of a low-grade kind, such as absorbent papers, including kraft paper which is in the raw state, i.e., has not been pretreated with chemicals and/or natural polymeric substances, and which has a weight of from 60 to 150 $g/m^2$, unsized papers, papers of low freeness value, mechanical papers, unglazed or uncalendered papers, papers which are smooth on one side owing to the use of a dry glazing cylinder during their production, without additional complex measures, and which are therefore referred to as "machine-glazed papers", uncoated papers or papers produced from wastepaper, i.e., what are known as recycled papers. The paper to be treated in accordance with the invention may also of course, however, comprise high-grade paper types, such as low-absorbency papers, sized papers, papers of high freeness value, chemical papers, calendered or grazed papers, glassine papers, parchmentized papers or precoated papers. The boards as well may be of high or low grade.

The compositions of the invention are suitable, for example, for producing release, backing and interleaving papers, including interleaving papers which are employed in the production of, for example, cast films or decorative films, or of foam materials, including those of polyurethane. The compositions of the invention are also suitable, for example, for producing release, backing, and interleaving cards, films, and cloths, for treating the reverse faces of self-adhesive tapes or self-adhesive sheets or the written faces of self-adhesive labels. The compositions of the invention are additionally suitable for treating packing material, such as that comprising paper, cardboard boxes, metal foils and drums, e.g., cardboard, plastic, wood or iron, which is intended for storing and/or transporting tacky products, such as adhesives, sticky foodstuffs, e.g., cakes, honey, candies, and meat; bitumen, asphalt, greased materials, and crude rubber. A further example of the application of the compositions of the invention is the treatment of carriers for transferring pressure-sensitive adhesive films in the context of what is known as the transfer process.

The silicone block copolymers of the invention can also be extruded in order to produce coatings or coextruded in blends with film-forming polymers in order to produce films.

The application rate of the silicone block copolymer of the invention in the coatings can be determined empirically by the skilled worker and depends largely on its composition and on the use of the coated substrate.

The coatings and films of the invention offer a range of release properties appropriate for use in a variety of release applications. The coatings and films are useful in particular for producing substrates having abhesive properties, for producing preimpregnated material molds, and in the production of sheet molding compounds (SMC) and thick molding compounds (TMC), and also bulk molding compounds (BMC). The coatings and films can also be used in particular as a carrier web for the production of fiber-reinforced (FRP) sheets.

Preparation of the soft segment polymer component:

EXAMPLE 1

(1,3-diisopropenylbenzene-terminal polysiloxane): viscosity: 110 mm$^2$/s at 25° C.; n=0

1,3-Diisopropenylbenzene and polydimethylsiloxane which possesses terminal Si—H groups and has a chain length of 50 siloxane units are reacted with 10 ppm of a platinum complex, which acts as catalyst, at 80° C. for 5 hours. The molar ratio of double bonds of 1,3-diisopropenylbenzene to Si—H groups of the polydimethylsiloxane is 3:1. After the end of the reaction volatile fractions are removed under vacuum. This gives a polymer having a viscosity of 110 mm$^2$/s at 25° C.

EXAMPLE 2

(1,3-diisopropenylbenzene-terminal poly-siloxane): viscosity: 1150 mm$^2$/s at 25° C.; n=0

1,3-Diisopropenylbenzene and polydimethylsiloxane which possesses terminal Si—H groups and has a chain length of 200 siloxane units are reacted with 10 ppm of a platinum complex, which acts as catalyst, at 80° C. for 5 hours. The molar ratio of double bonds of 1,3-diisopropenylbenzene to Si—H groups of the polydimethylsiloxane is 3:1. After the end of the reaction volatile fractions are removed under vacuum. This gives a polymer having a viscosity of 1150 mm$^2$/s at 25° C.

EXAMPLE 3

(silicone segmented by organic groups): viscosity: 1250 mm$^2$/s at 25° C.; siloxane segments n=5

1,3-Diisopropenylbenzene and polydimethylsiloxane which possesses terminal Si—H groups and has a chain length of 50 siloxane units are reacted with 10 ppm of a platinum complex, which acts as catalyst, at 80° C. for 5 hours. The molar ratio of double bonds of diisopropenylbenzene to Si—H groups of the polydimethylsiloxane is 1.27. After the end of the reaction volatile fractions are removed under vacuum. This gives a polymer having a viscosity of 1250 mm$^2$/s at 25° C. The number of siloxane segments is 5.

EXAMPLE 4

(silicone segmented by organic groups): viscosity: 2200 mm$^2$/s at 25° C.; siloxane segments n=7

1,3-Diisopropenylbenzene and polydimethylsiloxane which possesses terminal Si—H groups and has a chain length of 50 siloxane units are reacted with 10 ppm of a platinum complex, which acts as catalyst, at 80° C. for 5 hours. The molar ratio of double bonds of diisopropenylbenzene to Si—H groups of the polydimethylsiloxane is 1.20. After the end of the reaction volatile fractions are removed under vacuum. This gives a polymer having a viscosity of 2200 mm$^2$/s at 25° C. The number of siloxane segments is 7.

EXAMPLE 5

(silicone segmented by organic groups): viscosity: 10,500 mm$^2$/s at 25° C.; siloxane segments n=1,3-Diisopropenylbenzene and polydimethylsiloxane which possesses terminal Si—H groups and has a chain length of 50 siloxane units are reacted with 10 ppm of a platinum complex, which acts as catalyst, at 80° C. for 5 hours. The molar ratio of double bonds of diisopropenylbenzene to Si—H groups of the polydimethylsiloxane is 1.10. After the end of the reaction volatile fractions are removed under vacuum. This gives a polymer having a viscosity of 10,500 mm$^2$/s at 25° C. The number of siloxane segments is 11.

Preparation of the silicone block copolymers:

Polymerization in suspension:

EXAMPLE 6a

A 2 l three-necked flask with stirrer, reflux condenser, metering means, thermometer, heating means (with temperature monitoring), and nitrogen port is charged with 1.22 kg of deionized water, 3.77 g of copper acetate (1% strength aqueous solution), and 50.22 g of polyvinylpyrrolidine (PVP K90; 5% strength aqueous solution). The solution is stirred at 200 rpm for 10 minutes. In the interim a mixture of 200.86 g of 1,3-diisopropenylbenzene-terminal polysiloxane from example 1 and 301.3 g of styrene is prepared (styrene/silicone mass ratio is 60/40). To this mixture there are added 25.11 g of toluene. A combination of three different initiators is also added to the monomer mixture. Initiators used are 3.07 g of tert-butyl peroxy-2-ethylhexanoate (TBPEH; 98%; half-life t½=1 h at 92° C.), 4.02 g of tert-butyl peroxypivalate (TBPPI; 75% in aliphatics; half-life t½=1 h at 74° C.), and 5.42 g of tert-butyl peroxyneodecanoate (TBPND; 75% in aliphatics; half-life t½=1 h at 64° C.). The monomer mixture with the initiators is stirred at room temperature for 5 minutes and then added slowly to the aqueous charge in the three-necked flask. The contents of the flask are mixed by stirring at 200 rpm, as a result of which the monomers become suspended in water. Over the course of one hour (1 h) the temperature is then carefully raised to 55° C. and maintained for 4 h. The temperature is then raised to 70° C. over the course of 1 h and maintained for 4 h. In order to complete polymerization the temperature is raised to 80° C. and held for 5 h. The batch is cooled to room temperature. The beads obtained are isolated by threefold decanting and suction filtration. The product is washed 5 times in the suction filter with deionized water. The beads, which have a milky haze and diameters of about 0.2–2.5 mm, are dried in a drying cabinet at 35° C. for 24 hours.

Analysis 6a):
Solids content: >98%
Average bead diameter: about 1 mm
Color: milky white
Molecular weight $M_w$ (mass average from GPC; eluent THF): 198,000 g/mol (based on polystyrene standards)
Average molecular weight $M_n$: 24,000 g/mol
Dispersity: 8.25
Tg: −120° C. (polydimethylsiloxane block); +100° C. (polystyrene block)

EXAMPLE 6b

In analogy to example 6a) with the difference that during the synthesis of the silicone block copolymers in suspension no toluene is added. Otherwise, the monomers and amounts used are the same as those in example 6a), Analysis 6b):
Solids content: >98%
Average bead diameter: about 1 mm
Color: milky white
Molecular weight $M_w$ (mass average from GPC; eluent THF): 155,000 g/mol (based on polystyrene standards)
Average molecular weight $M_n$: 18,000 g/mol
Dispersity: 8.6
Tg: −120° C. (polydimethylsiloxane block); +100° C. (polystyrene block)

EXAMPLE 6c

In analogy to example 6a) with the difference that instead of toluene 26.0 g of ethylbenzene were used.

Analysis 6c):
Solids content: >98%
Average bead diameter: about 1 mm
Color: milky white
Molecular weight $M_w$ (mass average from GPC; eluent THF): 140,000 g/mol (based on polystyrene standards)
Average molecular weight $M_n$: 17,500 g/mol
Dispersity: 8.0
Tg: −120° C. (polydimethylsiloxane block); +100° C. (polystyrene block)

EXAMPLE 6d

As example 6a) only with an 80/20 (mass/mass) styrene/silicone monomer mixture.

Analysis 6d):
Solids content: >98%
Average bead diameter: about 1 mm
Color: milky white
Molecular weight $M_w$ (mass average from GPC; eluent THF): 230,000 g/mol (based on polystyrene standards)
Average molecular weight $M_n$: 24,000 g/mol
Dispersity: 9.6
Tg: −120° C. (polydimethylsiloxane block); +100° C. (polystyrene block)

EXAMPLE 6e

As example 6a) only with 5.12 g of tert-butyl peroxy-2-ethylhexanoate (TBPEH; 98%), 6.7 g of tert-butyl peroxypivalate (TBPPI; 75% in aliphatics), and 9.0 g of tert-butyl peroxyneodecanoate (TBPND; 75% in aliphatics).

Analysis 6e):
Solids content: >98%
Average bead diameter: about 1 mm
Color: milky white
Molecular weight $M_w$ (mass average from GPC; eluent THF): 170,000 g/mol (based on polystyrene standards)
Average molecular weight $M_n$: 21,000 g/mol
Dispersity: 8.1
Tg: −120° C. (polydimethylsiloxane block); +100° C. (polystyrene block)

EXAMPLE 6f

As example 6a) only with a maximum polymerization temperature of 90° C. Polymerization is carried out at 55° C. for 4 h, at 70° C. for 4 h, at 80° C. for 2 h, and at 90° C. for 5 h.

Analysis 6f):
Solids content: >98%
Average bead diameter: about 1 mm
Color: milky white
Molecular weight $M_w$ (mass average from GPC; eluent THF): 220,000 g/mol (based on polystyrene standards)
Average molecular weight $M_n$: 23,000 g/mol
Dispersity: 9.6
Tg: −120° C. (polydimethylsiloxane block); +100° C. (polystyrene block)

EXAMPLE 6g

As example 6a) only with 3.07 g of dibenzoyl peroxide (water-moist powder; half-life t½=1 h at 91° C.), 4.02 g of tert-amyl peroxypivalate (75% in aliphatics; half-life t½=1 h at 72° C.), and di(2-ethylhexyl) peroxydicarbonate (75% in aliphatics; half-life t½=1 h at 57° C.).

Analysis 6g):
Solids content: >98%
Average bead diameter: about 1 mm
Color: milky white
Molecular weight $M_w$ (mass average from GPC; eluent THF): 280,000 g/mol (based on polystyrene standards)
Average molecular weight $M_n$: 26,000 g/mol
Dispersity: 10.8
Tg: −120° C. (polydimethylsiloxane block); +100° C. (polystyrene block)

EXAMPLE 7a

A 2 l three-necked flask with stirrer, reflux condenser, metering means, thermometer, heating means (with temperature monitoring), and nitrogen port is charged with 1.22 kg of deionized water, 3.77 g of copper acetate (1% strength aqueous solution), and 50.22 g of polyvinylpyrrolidine (PVP K90; 5% strength aqueous solution). The solution is stirred at 200 rpm for 10 minutes. In the interim a mixture of 200.9 g of silicone segmented by organic groups from example 3 and 301.3 g of styrene is prepared (styrene/silicone mass ratio is 60/40). To this mixture there are added 25.11 g of toluene. A combination of three different initiators is also added to the monomer mixture. Initiators used are 3.07 g of tert-butyl peroxy-2-ethylhexanoate (TBPEH; 98%; half-life t½=1 h at 92° C.), 4.02 g of tert-butyl peroxypivalate (TBPPI; 75% in aliphatics; half-life t½=1 h at 74° C.), and 5.42 g of tert-butyl peroxyneodecanoate (TBPND; 75% in aliphatics; half-life t½=1 h at 64° C.). The monomer mixture with the initiators is stirred at room temperature for 5 minutes and then added slowly to the aqueous charge in the three-necked flask. The contents of the flask are mixed by stirring at 200 rpm, as a result of which the monomers become suspended in water. Over the course of one hour (1 h) the temperature is then carefully raised to 55° C. and maintained for 4 h. The temperature is then raised to 70° C. over the course of 1 h and maintained for 4 h. In order to complete polymerization the temperature is raised to 80° C.

and held for 5 h. The batch is cooled to room temperature. The beads obtained are isolated by threefold decanting and suction filtration. The product is washed 5 times in the suction filter with deionized water. The beads, which have a milky haze and diameters of about 0.2–2.5 mm, are dried in a drying cabinet at 35° C. for 24 hours.

Analysis 7a):
Solids content: >98%
Average bead diameter: about 1 mm
Color: milky white
Molecular weight $M_w$ (mass average from GPC; eluent THF): 250,000 g/mol (based on polystyrene standards)
Average molecular weight $M_n$: 25,000 g/mol
Dispersity: 10.0
Tg: −120° C. (polydimethylsiloxane block); +100° C. (polystyrene block)

EXAMPLE 7b

In analogy to example 7a) with the difference that during the synthesis of the silicone block copolymers in suspension no toluene is added. Otherwise, the monomers and amounts used are the same as those in example 7a).

Analysis 7b):
Solids content: >98%
Average bead diameter: about 1 mm
Color: milky white
Molecular weight $M_w$ (mass average from GPC; eluent THF): 91,000 g/mol (based on polystyrene standards)
Average molecular weight $M_n$: 19,000 g/mol
Dispersity: 4.8
Tg: −120° C. (polydimethylsiloxane block); +100° C. (polystyrene block)

EXAMPLE 7c

In analogy to example 7a) with the difference that instead of toluene 26.0 g of ethylbenzene were used.

Analysis 7c):
Solids content: >98%
Average bead diameter: about 1 mm
Color: milky white
Molecular weight $M_w$ (mass average from GPC; eluent THF): 200,000 g/mol (based on polystyrene standards)
Average molecular weight $M_n$: 23,000 g/mol
Dispersity: 8.7
Tg: −120° C. (polydimethylsiloxane block); +100° C. (polystyrene block)

EXAMPLE 7d

As example 7a) only with an 80/20 (mass/mass) styrene/silicone monomer mixture.

Analysis 7d):
Solids content: >98%
Average bead diameter: about 1 mm
Color: milky white
Molecular weight $M_w$ (mass average from GPC; eluent THF): 205,000 g/mol (based on polystyrene standards)
Average molecular weight $M_n$: 24,500 g/mol
Dispersity: 8.4
Tg: −120° C. (polydimethylsiloxane block); +100° C. (polystyrene block)

EXAMPLE 7e

As example 7a) only with 5.12 g of tert-butyl peroxy-2-ethylhexanoate (TBPEH; 98%), 6.7 g of tert-butyl peroxypivalate (TBPPI; 75% in aliphatics), and 9.0 g of tert-butyl peroxyneodecanoate (TBPND; 75% in aliphatics).

Analysis 7e):
Solids content: >98%
Average bead diameter: about 1 mm
Color: milky white
Molecular weight $M_w$ (mass average from GPC; eluent THF): 150,000 g/mol (based on polystyrene standards)
Average molecular weight $M_n$: 20,000 g/mol
Dispersity: 7.5
Tg: −120° C. (polydimethylsiloxane block); +100° C. (polystyrene block)

EXAMPLE 7f

As example 7a) only with a maximum polymerization temperature of 90° C. Polymerization is carried out at 55° C. for 4 h, at 70° C. for 4 h, at 80° C. for 2 h, and at 90° C. for 5 h.

Analysis 7f):
Solids content: >98%
Average bead diameter: about 1 mm
Color: milky white
Molecular weight $M_w$ (mass average from GPC; eluent THF): 250,000 g/mol (based on polystyrene standards)
Average molecular weight $M_n$: 25,000 g/mol
Dispersity: 10.0
Tg: −120° C. (polydimethylsiloxane block); +100° C. (polystyrene block)

EXAMPLE 7g

As example 7a) only with 3.07 g of dibenzoyl peroxide (water-moist powder; half-life t½=1 h at 91° C.), 4.02 g of tert-amyl peroxypivalate (75% in aliphatics; half-life t½=1 h at 72° C.), and di(2-ethylhexyl) peroxydicarbonate (75% in aliphatics; half-life t½=1 h at 57° C.).

Analysis 7g):
Solids content: >98%
Average bead diameter: about 1 mm
Color: milky white
Molecular weight $M_w$ (mass average from GPC; eluent THF): 235,000 g/mol (based on polystyrene standards)
Average molecular weight $M_n$: 25,000 g/mol
Dispersity: 11.0
Tg: −120° C. (polydimethylsiloxane block); +100° C. (polystyrene block)

Polymerization in solution:

EXAMPLE 8

A 10 l autoclave with stirrer, metering means, reflux condenser, thermometer, heating means (with temperature monitoring), and nitrogen supply is charged with 6.39 g of toluene. With stirring at 120 rpm the following reactants are added in succession: 668.8 g of 1,3-diisopropenylbenzene-terminal polysiloxane from example 1; 2.01 kg of styrene; 30.9 g of Interox TMCH 50 AL (initiator; 1,1-bis(t-butylperoxy)-3,3,5-trimethylcyclohexane; 50% in aliphatics). For polymerization the mixture is then heated to 110° C. After 3 h, at about 50% monomer conversion, a further 30.9 g of TMCH are added. The batch is stirred at 120 rpm and 110° C. for a total of 7 h. For afterconditioning in each case 4 times 130 g of styrene with 14.3 g of TMCH are added (the first 2 times every 30 minutes, then twice each hour). For postpolymerization 6 times 14.3 g of Interox BCHPC-75-W (di(4-tert-butylcyclohexyl) peroxydicarbonate) in solution in 60 ml of toluene are added. Following polymerization the solution (approximately 30% strength) with the copolymer can be used directly. To isolate the solid the solution is distilled.

Analysis 8:
Solids content: >98%
Granules
Molecular weight $M_w$ (mass average from GPC; eluent THF): 91,000 g/mol (based on polystyrene standards)
Average molecular weight $M_n$: 11,500 g/mol
Dispersity: 7.9

EXAMPLE 9

A 10 l autoclave with stirrer, metering means, reflux condenser, thermometer, heating means (with temperature monitoring), and nitrogen supply is charged with 6.39 g of toluene. With stirring at 120 rpm the following reactants are added in succession: 668.8 g of silicone segmented by organic groups from example 3; 2.01 kg of styrene; 30.9 g of Interox TMCH 50 AL (initiator; 1,1-bis(t-butylperoxy)-3,3,5-trimethylcyclohexane; 50% in aliphatics). For polymerization the mixture is then heated to 110° C. After 3 h, at about 50% monomer conversion, a further 30.9 g of TMCH are added. The batch is stirred at 120 rpm and 110° C. for a total of 7 h. For afterconditioning in each case 4 times 130 g of styrene with 14.3 g of TMCH are added (the first 2 times every 30 minutes, then twice each hour). For postpolymerization 6 times 14.3 g of Interox BCHPC-75-W (di(4-tert-butylcyclohexyl) peroxydicarbonate) in solution in 60 ml of toluene are added. Following polymerization the solution (approximately 30% strength) with the silicone block copolymer can be used directly. To isolate the solid the solution is distilled.

Analysis 9:
Solids content: >98%
Granules
Molecular weight $M_w$ (mass average from GPC; eluent THF): 80,000 g/mol (based on polystyrene standards)
Average molecular weight $M_n$: 7,000 g/mol
Dispersity: 11.4

Application: Coating:

EXAMPLE 10

The silicone block copolymers from examples 6a–g and 8 are dissolved in toluene. PP films (polypropylene films) are coated with the solution and the abhesive properties are determined in accordance with FINAT test method no. 3 using the TESA test adhesive tapes A 7475, K 7576, and T 154. The results are summarized in table 1.

TABLE 1

| | Release force [N/m] | | |
|---|---|---|---|
| | A 7475 | K 7576 | T 154 |
| 3a | 28.1 | 35.1 | 5.6 |
| 3b | 8.0 | 15.4 | 2.2 |
| 3c | 58.5 | 114.3 | 15.3 |
| 3d | 22.5 | 46.0 | 4.5 |
| 3e | 22.0 | 39.5 | 4.2 |
| 3f | 33.9 | 49.9 | 5.9 |
| 3g | 16.0 | 24.8 | 2.8 |
| 4a | 60.2 | 127.9 | 15.3 |

EXAMPLE 11

The silicone block copolymers from examples 7a–g and 9 are dissolved in toluene. PP films (polypropylene films) are coated with the solution and the abhesive properties are determined in accordance with FINAT test method no. 3 using the TESA test adhesive tapes A 7475, K 7576, and T 154. The results are summarized in table 2.

TABLE 2

| | Release force [N/m] | | |
|---|---|---|---|
| | A 7475 | K 7576 | T 154 |
| 4a | 20.1 | 35.8 | 4.5 |
| 4b | 55.7 | 66.6 | 12.1 |
| 4c | 56.5 | 104.3 | 13.8 |
| 4d | 31.1 | 32.1 | 5.4 |
| 4e | 21.0 | 31.5 | 4.6 |
| 4f | 32.9 | 45.9 | 4.7 |
| 4g | 17.2 | 26.8 | 3.3 |
| 5 | 54.2 | 97.9 | 13.3 |

Application: Extrusion:

EXAMPLE 12

The silicone block copolymers from examples 6a–g and 8 were coextruded onto a filmic substrate. The release forces were determined from the silicone block copolymer side. The coextruded films exhibit similar values with respect to the TESA test adhesive tapes as to the films coated from solution.

EXAMPLE 13

The silicone block copolymers from examples 7a–g and 9 were coextruded onto a filmic substrate. The release forces were determined from the silicone block copolymer side. The coextruded films exhibit similar values with respect to the TESA test adhesive tapes as to the films coated from solution.

What is claimed is:

1. Thermoplastic silicone block copolymers comprising
   (A) a hard segment polymer component comprising a polymer prepared from monomers selected from the group consisting of styrene, methyl methacrylate, butyl acrylate, acrylonitrile, vinyl monomers, and mixtures thereof, and
   (B) a soft segment polymer component of the general formula

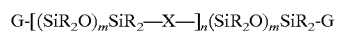

$$G\text{-}[(SiR_2O)_m SiR_2\text{---}X\text{---}]_n (SiR_2O)_m SiR_2\text{-}G \qquad (I)$$

where each R is an identical or different monovalent, optionally halogenated hydrocarbon radical having 1 to 18 carbon atoms per radical, each X independently is a divalent radical selected from the group consisting of the radicals of the formula

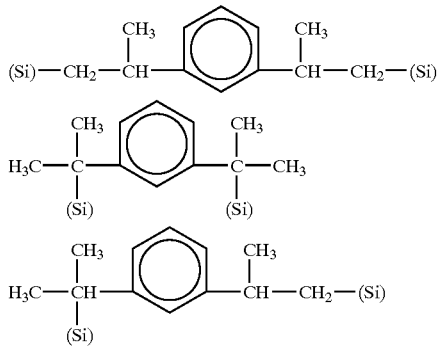

each G is an identical or different radical (A)-Z-(Si) or Z'-(Si),
where Z is a divalent radical selected from the group consisting of radicals of the formula

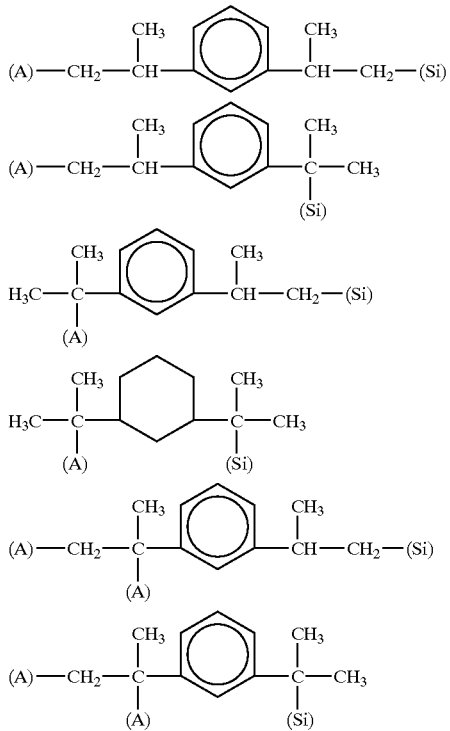

and Z' independently is a monovalent radical of the formula

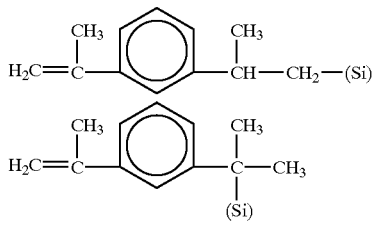

where (A)- is a bond to the hard segment polymer component (A) and (Si)— is a bond to the silicon atom in (B), with the proviso that in the formula (I) not more than one radical G can be a radical Z', m is an integer from 1 to 1000, and n is 0 or an integer from 1 to 20, with the proviso that if n is not 0 then for the product of n and m, $4 \leq n \cdot m \leq 1000$.

2. The thermoplastic silicone block copolymers of claim 1, wherein (A) is polystyrene.

3. The thermoplastic silicone block copolymer of claim 1, wherein said block copolymer is an A-B-A block copolymer.

4. The thermoplastic silicone block copolymer of claim 2, wherein said block copolymer is an A-B-A block copolymer.

5. A process for preparing a thermoplastic silicone block copolymer of claim 1, comprising reacting a soft segment polymer (B') of the general formula $$Z'\text{-}[(SiR_2O)_m SiR_2\text{—}X\text{—}]_n(SiR_2O)_m SiR_2\text{-}Z' \qquad (I')$$

with monomers of a hard segment polymer component (A) in the presence of free-radical initiators in a free radical addition polymerization.

6. A process for preparing a thermoplastic silicone block copolymer of claim 2, comprising reacting a soft segment polymer (B') of the general formula $$Z'\text{-}[(SiR_2O)_m SiR_2\text{—}X\text{—}]_n(SiR_2O)_m SiR_2\text{-}Z' \qquad (I')$$

with monomers of a hard segment polymer component (A) in the presence of free-radical initiators in a free radical addition polymerization.

7. A process for preparing a thermoplastic silicone block copolymer of claim 3, comprising reacting a soft segment polymer (B') of the general formula $$Z'\text{-}[(SiR_2O)_m SiR_2\text{—}X\text{—}]_n(SiR_2O)_m SiR_2\text{-}Z' \qquad (I')$$

with monomers of a hard segment polymer component (A) in the presence of free-radical initiators in a free radical addition polymerization.

8. The process of claim 5, wherein the monomer of the hard segment polymer component (A) comprises styrene.

9. The process of claim 5, wherein the monomer of the hard segment polymer component (A) consists of styrene.

10. An abhesive coating comprising a thermoplastic silicone block copolymer of claim 1.

11. An abhesive coating comprising a thermoplastic silicone block copolymer of claim 2.

12. A release coated article comprising a substrate, and coated on said substrate, an adhesive coating comprising the thermoplastic silicone block copolymer of claim 1.

13. A release coated article comprising a substrate, and coated on said substrate, an abhesive coating comprising the thermoplastic silicone block copolymer of claim 2.

14. An abhesive coating or film comprising a blend of a thermoplastic silicone block copolymer of claim 1 and at least one film-forming polymer different from said thermoplastic silicone copolymer.

15. An abhesive coating or film comprising a blend of a thermoplastic silicone block copolymer of claim 2 and at least one film-forming polymer different from said thermoplastic silicone copolymer.

* * * * *